July 9, 1968 R. G. BREWER ET AL 3,392,368
ULTRASONIC AND HYPERSONIC SOUND GENERATOR
Original Filed Nov. 2, 1964

INVENTORS
RICHARD G. BREWER
KLAUS E. RIECKHOFF
BY
Edward W. Brown
ATTORNEY

3,392,368
ULTRASONIC AND HYPERSONIC SOUND GENERATOR

Richard G. Brewer, Palo Alto, and Klaus E. Rieckhoff, San Jose, Calif., assignors to International Business Machines Corporation, Armonk, N.Y., a corporation of New York
Continuation of application Ser. No. 408,198, Nov. 2, 1964. This application Mar. 15, 1967, Ser. No. 623,471
6 Claims. (Cl. 340—12)

ABSTRACT OF THE DISCLOSURE

A sound generator for generating acoustic waves, which comprises a laser and a liquid medium, into which the laser beam is incident. At a laser power level of approximately 10 megawatts/cm.$^2$, the laser beam will produce acoustic waves in the liquid. Any liquid with long phonon lifetime can be utilized.

---

This is a continuation of copending application Ser. No. 408,198 filed on Nov. 2, 1964 for "Sound Generator," and now abandoned. This invention relates to the generation of sound and more particularly to the generation of ultrasonic and hypersonic waves.

It has been discovered that when a liquid is placed in the path of the light from a giant-pulse laser, stimulated Brillouin scattering results and, in addition, a coherent hypersonic wave having a frequency in the gigacycle range and a directional ultrasonic wave containing a large fraction of the laser input energy.

Preferably, in order to produce the hypersonic and ultrasonic waves, the giant-pulse laser should be capable of generating a 10–20 megawatt output. If, however, the beam of the laser is focused, the laser output need only be such that approximately 10 megawatts/cm.$^2$ are obtained at the point of focus. The liquids best suited for the present invention are ones which have a long phonon lifetime, i.e.—greater than one nanosecond, or a slow relaxation for the acoustical frequencies being generated.

The foregoing and other features and advantages of the invention will be apparent from the following more particular description of preferred embodiments of the invention, as illustrated in the accompanying drawing.

Figure 1:
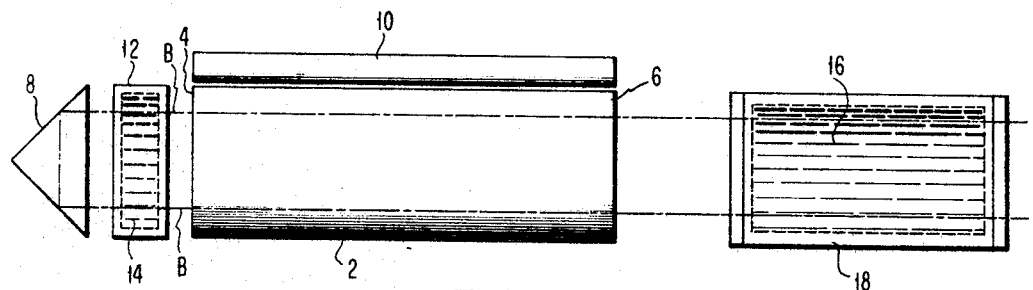
FIGURE 1 is a schematic diagram of the invention employing a liquid cell with unfocused giant-pulse laser.

The laser crystal 2, suitable for use in a present invention, is an aluminum oxide crystal doped with chromium and is generally called a ruby. Each of the ends 4, 6 of the crystal 2 is prepared with optically polished surfaces. Adjacent the end 4 of the crystal is a prism 8 which acts as a total reflector and in conjunction with the surface of crystal end 6 forms a resonant optical cavity. Above the ruby crystal 2 is a flashlamp 10, which is connected to a suitable source of power not shown.

Interposed between said prism 8 and ruby crystal 2 is a Q-switch or Q-spoiler, such as a transparent cell 12 which houses a solution of a bleachable dye 14. Herein, the dye 14 is vanadium-phthalocyanine in a nitrobenzene solvent. This dye has a peak absorption of light very close to 6943 A. of the laser crystal 2 and has the property of becoming bleached in a short time compared with the lifetime of stimulated radiation of the laser. Other metal phthalocyanine dyes also have this property and may be used in place of the vanadium-phthalocyanine.

In operation, the flashlamp 10 is flashed and this energy is absorbed by the laser crystal 2 to produce a standing wave B—B of light which passes through the cell 12 and is attenuated by the dye solution 14. This attenuation in the resonant cavity is sufficient to prevent laser action until the dye 14 is bleached. As soon as the bleaching occurs, the dye solution 14 loses its absorption characteristic and transmits all of the light passing through it. Thus, the energy is concentrated in a single giant-laser pulse which, herein, is 30–40 nanoseconds wide and has a peak power of 10–20 megawatts.

If desired, a calcium tungstate crystal doped with neodymium or any other laser material, which either alone or in combination with a Q-spoiler is capable of generating pulses which are at least 10 megawatt/cm.$^2$ at the point of focus, can be used in place of the ruby crystal. Also, the dye 14 can be dispersed in a transparent plastic coating instead of being contained in solution in the cell 12. Alternatively, the bleachable dye containing cell 12 can be replaced by a Kerr shutter or a rotating mirror, either of which can serve as the Q-switch. Or, the cell 12 can be removed and the prism 8 rotated to cause the Q-switching.

According to the present invention, a liquid medium 16 is positioned to receive the giant output pulses of the laser and in response to the pulses generates hypersonic waves having a frequency in the gigacycle ($10^9$) range and an intense ultrasonic wave having a fundamental frequency of about 500 kilocycles and harmonics thereof up to and including the tenth harmonic. The energy in the hypersonic wave is substantial and is of the order of at least 60 ergs but it is surpassed by the energy in the ultrasonic wave, which contains more than 10% of the input energy of the laser pulse. Thus, with an input laser energy of one joule, the energy of the ultrasonic wave would be at least one-tenth of a joule.

Polar liquids, such as water, glycerol, tetrahydrofuran, and bromobenzene, and non-polar liquids such as carbon disulfide, benzene, carbon tetrachloride, and hexane all have been found to be operable as the liquid medium for generating both hypersonic and ultrasonic waves. It will be noted that these examples represent inorganic liquids and aliphatic, aromatic, and heterocyclic organic liquids. Preferably, the liquid is one which has a phonon lifetime greater than a nanosecond, such as water and carbon disulfide.

Figure 2:
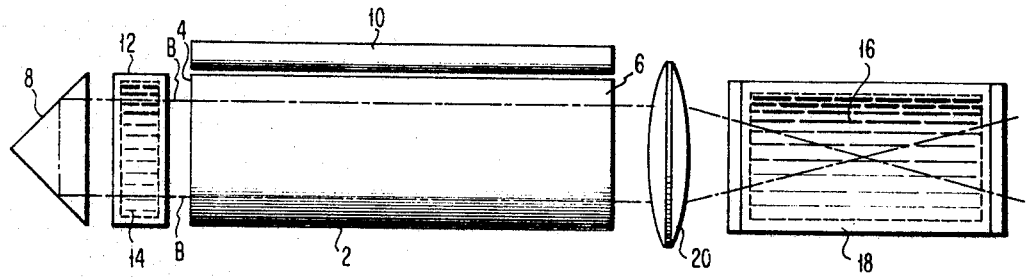
FIGURE 2 is a schematic diagram of the invention employing a liquid cell in combination with a focused giant-pulse laser.

As shown in FIGS. 1 and 2 for purposes of illustration, the liquid medium 16 is contained in a cell 18. Herein, the cell 18 is a 10 cm. glass cell but other materials which are transparent to the laser light could be used. In the preferred embodiment of FIG. 2, a lens 20 is interposed inbetween the laser crystal 2 and the cell 18 for focusing the laser light in the liquid 16 so as to concentrate the light therein. A 5 cm. focal length lens is suitable for this purpose.

Stimulated Brillouin scattering and hypersonic waves were identified interferometically by using a 45° glass beam splitter between the laser and the lens (FIG. 2). Back scattered light from the beam splitter was directed onto a ground glass placed in front of a Fabry-Perot interferometer whose transmitted light came into focus on a I-N plate. The most intense range in each Fabry-Perot order was the laser emission which, when water was used as the liquid medium, separates three orders of Stokes (inner rings) two orders of anti-Stokes (outer rings). In accordance with energy conservation and the momentum matching condition $\vec{K}_0 = \vec{K}_{-1} + \vec{K}_s$, the laser energy ($K_0$) will generate back scattering Brillouin-Stokes radiation ($\vec{K}_{-1}$) and a forward acoustical wave ($\vec{K}_s$) which is in the gigacycle range and for liquids was found to have a frequency of about $6 \times 10^9$ cycles per second. Depending on the particular liquid employed, the frequency will be slightly more or less than $6 \times 10^9$ cycles per second and can be calculated from the Brillouin expression $$V_s = 2V_o(nv/c) \sin(\theta/2)$$

wherein $n$ is the index of refraction of the liquid, V is the velocity of sound in the liquid and $\theta$ is the angle between the incident laser beam and the scattered light.

When the water was removed from the cell, only a single ring system appears as a result of the laser light. When benzene was submitted for the water in the cell, there was only one order of Stokes and only one order of anti-Stokes.

Figure 3:
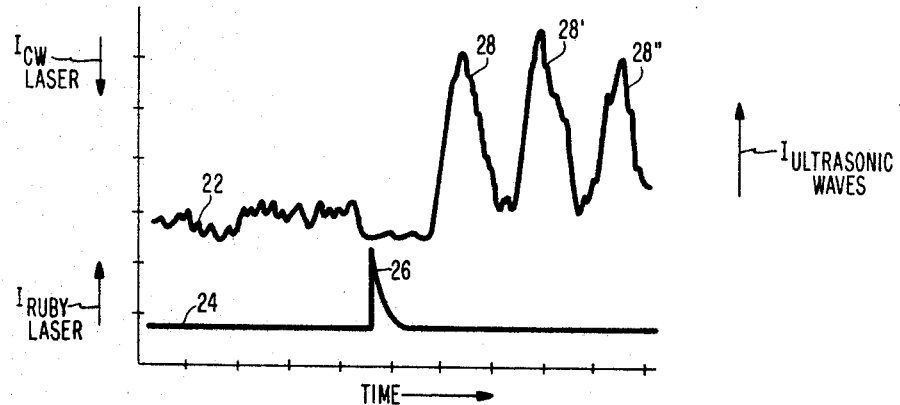
FIGURE 3 shows the effect on a continuous wave laser beam (upper trace) passing through the liquid cell after the giant-pulse has been received.

Observation of ultrasonic waves was achieved by monitoring the light of a continuous wave (CW) helium-neon laser operating at 6328 A. and traversing the liquid at an angle of about 10° with respect to the giant-pulse laser beam. The passage of the CW light through the liquid medium was interrupted periodically by an ultrasonic wave originating with the giant-pulse and persisting long after the giant-pulse is terminated. As shown in FIGURE 3, the upper trace 22 represents the output of the CW helium-neon laser. The lower trace 24 represents one output pulse of the giant-pulse laser. The increasing intensity of the CW laser, the ruby laser, and the ultrasonic waves is indicated by the direction of their respective arrows. It will be noted in FIGURE 3 that the output of the CW laser is essentially constant before the pulse 26 from the ruby laser. After the pulse 26 the CW laser beam is interrupted periodically so that a train of ultrasonic pulses 28, 28', and 28" are produced. The ultrasonic wave 28 originated with the giant-laser pulse and the train of pulses results from repeated reflection of the original pulse 28 off the wall of the cell 18 containing the liquid medium 16. The pulses were found to have a width of two microseconds and a repetition interval of about 20 microseconds. While the origin of the ultrasonic wave in the liquid medium has not been established, it is believed to be due to plasma formation which is induced by the laser pulse 26 and which causes further absorption of laser light to produce an intense acoustical wave.

According to another feature of the present invention, it also has been discovered that if a material which will increase the absorption of the laser pulse is placed at the focal point in the liquid, there is an increase in the amount of energy transferred from the laser pulse to the liquid medium 16. For example, an overexposed piece of photographic film has been found to be suitable for this purpose. It will be apparent that other such light absorptive materials can be used for this purpose.

Although the sound generator of the present invention can be utilized in a variety of ways known in the art (see Blitz, Fundamentals of Ultrasonics, 1963), it is particularly suited for use in a sonar device for mapping the ocean's floor. This is because the power density of the ultrasonic pulses is in the order of tens of megawatts per cubic centimeter and, hence, would permit the mapping of even the deep regions of the ocean. On pages 204, 205, Blitz describes the use of ultrasonic pulses in cleaning, a use to which the instant invention is particularly well suited. Following the illustration (FIG. 8-4, page 205), the samples to be cleaned are placed in the liquid medium 16 and ultrasonic waves are generated in the liquid 16 by the laser 2.

While the invention has been particularly shown and described with reference to preferred embodiments thereof, it will be understood by those skilled in the art that variations in form may be made therein without departing from the spirit and scope of the invention.

What is claimed is:

1. A sound generator comprising:
    a laser capable of producing high energy pulses of at least 10 megawatts, and
    a liquid disposed adjacent said laser in position to receive the high energy laser pulses which liquid converts a substantial portion of the energy of the pulse to ultrasonic waves having a fundamental frequency of about 500 kilocycles.

2. A sound generator comprising:
    a laser capable of producing high energy pulses,
    a liquid disposed adjacent said laser in position to receive the high energy laser pulses which liquid converts a substantial portion of the energy of the pulses to ultrasonic waves having a fundamental frequency of about 500 kilocycles, and
    a lens interposed between said laser and said liquid for focusing the laser pulses in the liquid so that the power of the laser pulse at the point of focus is at least ten megawatts/cm.$^2$.

3. The sound generator of claim 2 wherein the liquid medium is one which has a phonon lifetime greater than one nanosecond.

4. The sound generator of claim 2 wherein the liquid medium is selected from the group consisting of water, glycerol, tetrahydrofuran, bromobenzene, carbon disulfide, benzene, carbon tetrachloride, and hexane.

5. The sound generator of claim 2 further comprising:
    a material disposed at the focal point in said liquid and capable of absorbing the laser pulses so as to increase the energy transferred from the laser pulses to the liquid medium.

6. A sound generator comprising:
    a ruby laser having a resonant optical cavity,
    a Q-spoiler disposed within said cavity and capable of coacting with said laser to produce high energy pulses of at least 10 megawatts,
    a water medium disposed adjacent said laser in position to receive the high energy laser pulses which water medium converts a substantial portion of the energy of the pulses to ultrasonic waves having a fundamental frequency of about 500 kilocycles.

References Cited

Chiao et al.: "Physical Review Letters," May 25, 1964, pp. 592–595 (copy in Sci. Lib.).

ROY LAKE, *Primary Examiner.*

DARWIN R. HOSTETTER, *Assistant Examiner.*